(12) United States Patent
Smith et al.

(10) Patent No.: US 7,809,668 B1
(45) Date of Patent: Oct. 5, 2010

(54) SYSTEM AND METHOD TO AVOID OSCILLATORY BEHAVIOR IN PROPORTIONAL-INTEGRAL-DERIVATIVE (PID) CONTROLLERS BY USING FUZZY INFERENCE AND MODIFIED/ACTIVE DAMPING

(75) Inventors: Carlos A. Smith, Tampa, FL (US); Marco E. Sanjuan, Barranquilla (CO)

(73) Assignees: Universidad del Norte, Barranquilla (CO); University of South Florida, Tampa, FL (US)

( * ) Notice: Subject to any disclaimer, the term of this patent is extended or adjusted under 35 U.S.C. 154(b) by 483 days.

(21) Appl. No.: 11/943,720

(22) Filed: Nov. 21, 2007

Related U.S. Application Data

(60) Provisional application No. 60/866,895, filed on Nov. 22, 2006.

(51) Int. Cl.
*G06F 17/00* (2006.01)

(52) U.S. Cl. .................. 706/47; 706/1; 706/8; 700/42; 700/50

(58) Field of Classification Search .................. 706/47, 706/62, 1–9; 700/28–50
See application file for complete search history.

(56) References Cited

U.S. PATENT DOCUMENTS

| 5,714,831 | A * | 2/1998 | Walker et al. ........... 310/316.01 |
| 6,937,908 | B2 * | 8/2005 | Chang et al. ................... 700/37 |
| 2003/0067355 | A1 * | 4/2003 | Wojsznis et al. ............... 331/2 |
| 2009/0143871 | A1 * | 6/2009 | Gao et al. ..................... 700/29 |

* cited by examiner

*Primary Examiner*—David R Vincent
(74) *Attorney, Agent, or Firm*—Molly L. Sauter; Smith & Hopen, P.A.

(57) ABSTRACT

An instability avoidance module that can be implemented in SISO PID control loops to automatically adjust the controller's tuning parameters when undesired oscillatory behavior is monitored. This module is a Fuzzy-based Supervisor composed of a dynamic parameter identification module that operates on-line, and a Fuzzy Inference System (FIS) with fuzzy rules to modify PID tuning. Tests in nonlinear process models were performed, demonstrating that this Fuzzy Supervisor—Type 1 (non-intrusive) provides the PID controller the ability to adapt its tuning to eliminate the observed oscillatory behavior.

20 Claims, 10 Drawing Sheets

System Agent: 2 inputs, 3 outputs, 13 rules

SYSTEM AND METHOD TO AVOID OSCILLATORY BEHAVIOR IN PROPORTIONAL-INTEGRAL-DERIVATIVE (PID) CONTROLLERS BY USING FUZZY INFERENCE AND MODIFIED/ACTIVE DAMPING

CROSS-REFERENCE TO RELATED APPLICATIONS

This invention claims priority to U.S. Provisional Patent Application No. 60/866,895 filed on Nov. 22, 2006.

BACKGROUND OF THE INVENTION

A proportional-integral-derivative controller (PID controller) is a generic control loop feedback mechanism widely used in industrial control systems. A PID controller attempts to correct the error between a measured process variable and a desired setpoint by calculating and then outputting a corrective action that can adjust the process accordingly.

An instability avoidance module that can be implemented in single-input single-output (SISO) PID control loops to automatically adjust the controller's tuning parameters when undesired oscillatory behavior is monitored is desirable in control engineering. The performance of PID controllers working in industrial processes is affected by process nonlinearities or changes in process operating conditions. This loss of performance can be in the form of sluggish behavior (slow response) or oscillatory behavior (either stable or unstable oscillations). Out of these two, oscillatory behavior is the most dangerous for the process integrity.

Adaptive or self-tuning tuning provides an automated way to correct tuning problems during on-line controller operation. Methods included in this category must detect an undesired situation and take a compensatory action. In the prior art, self-tuning strategies are based on identifying behavioral response patterns by using if-then rules. If oscillations indicate that tuning is more aggressive than desired, adjustments are made. This technology is available in commercial controllers. Its disadvantage, however, rests in the fact that it uses crisp rules. Therefore, uncertainty in the behavior identification procedure is not considered. Another disadvantage is the fact that PID parameter adjustments are made as a sole function of degree of oscillation without incorporating possible causes for the oscillation. In other words, the prior art systems and methods treat an oscillatory response the same way, all the time, regardless of the cause of the oscillation.

A long-felt but unfulfilled need addressed by the present invention is to provide a method that will identify the source of the nonlinear behavior, whether it is gain-related, time constant-related or deadtime-related, and adjust the PID controller accordingly.

SUMMARY OF INVENTION

The present invention can detect process parameter changes by analyzing frequency of oscillations and has the ability to make adjustments based on these changes. The present invention provides a system and method for a supervision module that can be implemented to monitor PID controllers and adjust their tuning parameters in order to avoid dangerous oscillatory behavior.

Unstable behavior of a control loop is the most feared situation in control engineering. Since PID controllers are linear in nature, but still used in 90% of control loops in the process industry, their use in nonlinear processes increases the risk of closed-loop unstable response. The present invention provides an instability avoidance module that can be implemented in SISO PID control loops to automatically adjust the controller's tuning parameters when undesired oscillatory behavior is monitored. The system and method of the present invention is a fuzzy-based supervisor module composed of a dynamic parameter identification module that operates on-line, and a Fuzzy Inference System (FIS) with fuzzy rules to modify PID tuning. Tests in nonlinear process models were performed, demonstrating that this Fuzzy Supervisor—Type 1 (non-intrusive) system provides the PID controller with the ability to adapt its tuning to eliminate the observed oscillatory behavior.

The Fuzzy-Superior Type 1 (FST1) in accordance with an embodiment of the present invention allows manufacturing industrial processes to operate in a more efficient and safer way by detecting process changes in a way that an industrial controller can adjust its setting to improve performance.

In accordance with the present invention, a method of avoiding oscillatory behavior in a PID controller in a closed-loop process is provided. The method includes the steps of: identifying an ultimate set of tuning parameters for the closed-loop process; observing an oscillatory behavior response in the closed-loop process; identifying a damped natural frequency from the oscillatory behavior response; identifying a damping ratio from the oscillatory behavior response; calculating a modified damped natural frequency from the damped natural frequency; calculating a modified damping ratio from the damping ratio; determining the degree of oscillation of the oscillatory behavior response and determining the leading cause of the oscillatory behavior response from the calculated modified damped natural frequency and the calculated modified damping ratio of the oscillatory behavior response; and adjusting the ultimate set of tuning parameters of the closed-loop process based upon the degree oscillation of the oscillatory behavior response the leading cause of the oscillatory behavior response, thereby avoiding oscillatory behavior in the PID controller.

The present invention also discloses a PID controller system for avoiding oscillatory behavior in a closed-loop process. The PID controller system in accordance with an embodiment of the present invention includes: a characteristic frequency estimator to identify an ultimate set of tuning parameters for the closed-loop process experiencing an oscillatory behavior response; a peak detector to calculate a damped natural frequency and a damping ratio from the oscillatory behavior response of the closed-loop process; a scaling module to receive the damped natural frequency and the damping ratio and to output a modified damped natural frequency and a modified damping ratio; a fuzzy inference system to receive the modified damped natural frequency and the modified damping ratio, to determine the degree of oscillation of the oscillatory behavior response and to determine the leading cause of the oscillatory behavior response and to output a change factor vector based on the oscillatory behavior response; and an accumulator to receive the change factor vector and to output a new set of tuning parameters for the closed-loop process.

The present invention will find application in industrial controllers, both hardware and software, utilizing instability avoidance, including but not limited to, industries using a DCS (Distributed Control System) platform for industrial processes, such as refineries, petrochemicals, steel manufacturing, pharmaceuticals, consumer products and the like.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Most industrial controller manufacturers are always looking for methods to improve PID controller performance and reduce the chances of the controller exhibiting unstable behavior. The present invention presents a safe and non-intrusive way to avoid unstable behavior. It is considered non-intrusive because it will not change tuning parameters all the time. It will only act when the oscillations arise, it will eliminate them, and the operator will regain control of the tuning parameters.

Figure 1:
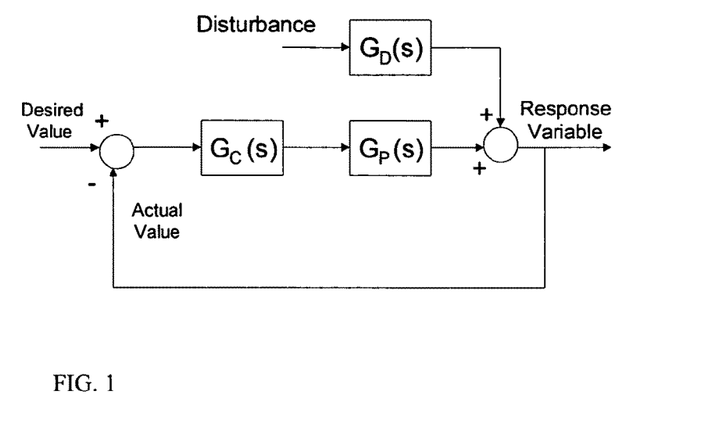
FIG. 1 is a SISO feedback control loop.

A Single-Input Single-Output (SISO) control loop operating with a feedback controller can be described using the block diagram presented in FIG. 1. $G_P(s)$ is the process transfer function, $G_D(s)$ is the disturbance transfer function, and $G_C(s)$ is the controller transfer function.

In industrial process control applications it is valid to work with continuous models and controllers because DCS (Distributed Control Systems) or microcomputer-based controllers sample the process with a negligible sampling period compared to the process response time. This leads us to the use of continuous form PID algorithms for the analysis of closed-loop behavior. The transfer function of a PID controller with filtered derivative mode is presented in Equation 1.

$$G_c(s) = \frac{M(s)}{E(s)} = K_C\left[1 + \frac{1}{T_I s} + \frac{T_D s}{\alpha T_D s + 1}\right] \quad (1)$$

As it was mentioned before, the process transfer function is not unique for a nonlinear system, as most industrial processes are. However, it is common practice in process engineering to identify self-regulated processes using a First-Order Plus Dead Time (FOPDT) model at the operating condition for tuning purposes. The transfer function for the FOPDT model is given by Equation 2.

$$G_p(s) = \frac{C(s)}{M(s)} = \frac{K_p e^{-t_0 s}}{\tau s + 1} \quad (2)$$

The parameters of this model are $K_P$, the process gain, $\tau$, the process time constant, and $t_0$, the process dead time. Common practice in control application indicates that tuning obtained based on this empirical model provides good performance about the conditions used for identification. Nonlinear behavior of a process is reflected in changes of these three parameters as operating conditions change.

One of the most commonly used sets of tuning equations is called the Controller Synthesis Method, or $\lambda$-tuning, based on Dahlin's controller synthesis [Smith and Corripio, 1997]. This tuning method provides Equation 3 for a PID controller (using the recommended value of $\lambda = 0.2\, t_0$).

$$K_c = \frac{\tau}{1.2 K_p t_0} \quad (3)$$

$$T_I = \tau$$

$$T_D = \frac{t_0}{2}$$

Figure 2:
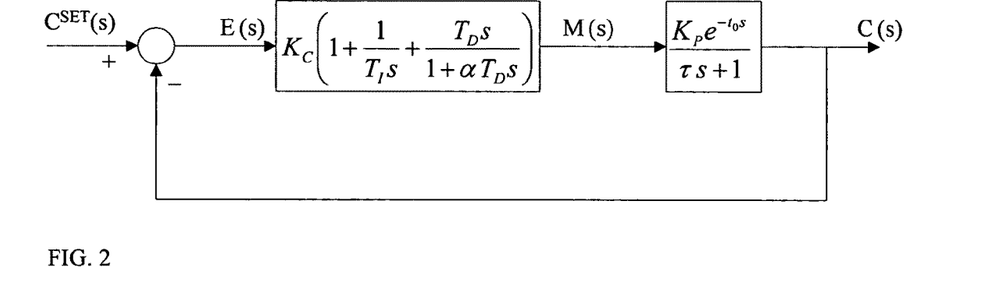
FIG. 2 is a closed-loop block diagram for PID control loop.

The closed-loop block diagram of the feedback control system is presented in FIG. 2.

For the stability analysis of the closed loop system the characteristic equation is presented as:

$$1 + G_{OLTF}(s) = 0 \quad (4)$$

where $G_{OLTF}$ is the open-loop transfer function given by:

$$G_{OLTF}(s) = G_c(s)G_p(s) = K_c\left(1 + \frac{1}{T_I s} + \frac{T_D s}{1 + \alpha T_D s}\right)\left(\frac{K_p e^{-t_0 s}}{\tau s + 1}\right) \quad (5)$$

Using frequency response techniques it can be established that marginal stability (sinusoidal behavior) is obtained when:

$$G_{OLTF}(s) = -1 \quad (6)$$

Since marginal stability is obtained when the roots of the characteristic equation are along the Imaginary axis, then $s = iw$. Therefore:

$$G_{OLTF}(iw) = -1$$

or $$\|G_{OLTF}(iw)\| = 1 \text{ and } \langle G_{OLTF}(iw)\rangle = \pm \pi \quad (7)$$

Using Eqs. 5 and 7, the solution for marginal stability is given by:

$$\|G_{OLTF}(iw)\| = 1 \quad (8)$$

$$\left\|K_c\left(1 + \frac{1}{T_I s} + \frac{T_D s}{\alpha T_D s + 1}\right)\right\|\left\|\frac{K_p e^{-t_0 s}}{\tau s + 1}\right\| = 1, \text{ for } s = iw$$

$$K_c\sqrt{\left(\frac{1}{T_I w} - T_D(\alpha+1)w\right)^2 + \left(1 + \frac{\alpha T_D}{T_I}\right)^2}$$

$$\frac{1}{\sqrt{1 + \alpha^2 w^2 T_D^2}}\frac{K_p}{\sqrt{1 + w^2 \tau^2}} = 1$$

and, $$\langle G_{OLTF}(iw)\rangle = 1 \qquad (9)$$

$$\left\langle K_c\left(1 + \frac{1}{T_I s} + \frac{T_D s}{\alpha T_D s + 1}\right)\right\rangle\left\langle \frac{K_p e^{-t_0 s}}{\tau s + 1}\right\rangle = \pm\pi, \text{ for } s = iw$$

$$\tan^{-1}\left(\frac{(T_I + \alpha T_D)w}{1 - T_I T_D(\alpha+1)w^2}\right) + \tan^{-1}\left(\frac{1}{\alpha T_D w}\right) + \tan^{-1}(-\tau w) - wt_0 = \pm\pi$$

Stability analysis solves for $K_C$ and w from Equations 8 and 9 in order to find the ultimate gain ($K_{CU}$) and the ultimate frequency ($w_U$). These values represent the maximum controller gain that can be used before the closed-loop system becomes unstable and the natural frequency at marginal stability.

This invention is based on the use of Equations 8 and 9 to obtain ultimate process characteristics $K_{PU}$, $\tau_U$, and $t_{0U}$, defined as the process characteristic values that given a tuning will lead a control system to marginal stability response. The analysis will also find $w_U^{K_P}$, $w_U^\tau$, and $w_U^{t_0}$, defined as the characteristic ultimate frequencies for a given process characteristic. In other words, it can be calculated by how much should a process characteristic change due to nonlinear process behavior in order to make a stable tuning behave with marginal stability. At the same time, given a marginal stability response, the calculation of the characteristic ultimate frequencies can be used to determine what process characteristic was affected by the nonlinear process behavior. This analysis is the core of the pattern identification technique used to design the fuzzy supervisor of the present invention. Every time a new tuning is loaded into the controller, ultimate process characteristics and their characteristic ultimate frequencies are calculated from Equations 8 and 9.

Since nonlinear behavior can be measured through the deviation from process characteristics (gain, time constant and dead time) in the fitted model, and these deviations can cause unstable behavior in the control loop, a supervisor can be designed to adjust PID tuning parameters when oscillatory behavior is detected. The overall components of the supervisor are presented in FIG. 3, wherein the PID controller 10 for controlling the process 15 includes a characteristic frequencies estimator 20, a scaling module 25, a peak detector 30, a fuzzy inference system 35 and an accumulator 40.

Figure 3:
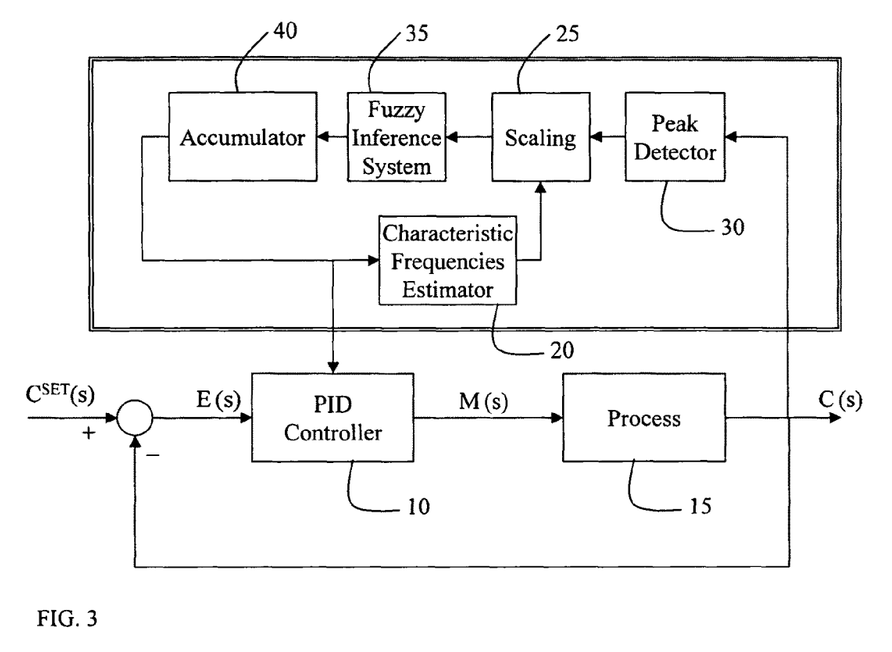
FIG. 3 is an illustration of fuzzy supervisor type 1 architecture.

The peak detection algorithm of the peak detector 30 is based on the assumption that the oscillatory closed-loop response can be identified as a second-order model. The parameters to be identified from the observed oscillatory behavior are the damped natural frequency, $\omega_D$, and the damping ratio, $\zeta$. These two parameters will later indicate how oscillatory the response is and what is the leading cause of oscillation.

Figure 4:
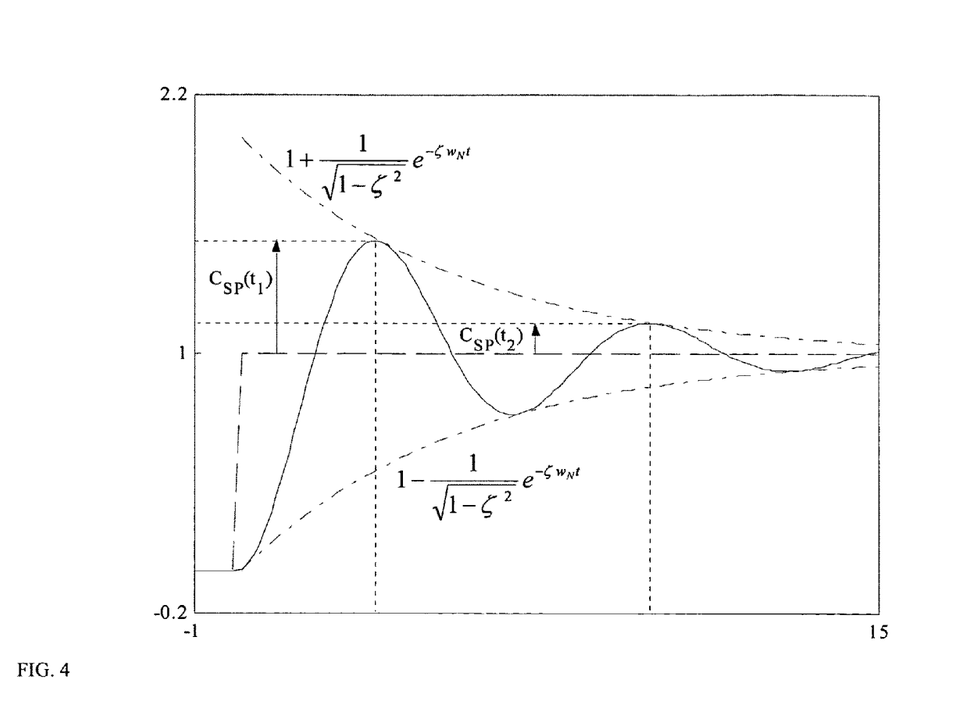
FIG. 4 is an illustration of the under-damped response of second-order system.

If an oscillatory behavior is observed, like the one presented in FIG. 4, the damped natural frequency and the damping ratio can be calculated from a dynamic analysis of the closed-loop system step response.

If the closed-loop system mimics a second-order behavior, then using deviation variables for set point and sensor response the following differential equation can be written:

$$\frac{d^2 C(t)}{dt^2} + 2\zeta w_N \frac{dC(t)}{dt} + w_N^2 C(t) = w_N^2 C^{SET}(t) \qquad (10)$$

Using Laplace transform:

$$s^2 C(s) + 2\zeta w_N s C(s) + w_N^2 C(s) = w_N^2 C^{SET}(s) \qquad (11)$$

$$G_{CLTF}(s) = \frac{C(s)}{C^{SET}(s)} = \frac{w_N^2}{s^2 + 2\zeta w_N s + w_N^2}$$

If a step of size $\Delta$ is introduced in the set point, then:

$$C(s) = \frac{\Delta w_N^2}{s(s^2 + 2\zeta w_N s + w_N^2)} = \Delta\left[\frac{1}{s} - \frac{s + 2\zeta w_N}{s^2 + 2\zeta w_N s + w_N^2}\right] \qquad (12)$$

$$C(s) = \Delta\left[\frac{1}{s} - \frac{s + \sigma}{(s+\sigma)^2 + w_D^2} - \frac{\sigma}{(s+\sigma)^2 + w_D^2}\right]$$

where $\sigma = \zeta w_N$ and $w_D = w_N \sqrt{1 - \zeta^2}$

Using Inverse Laplace Transform the time-domain solution is obtained:

$$C(t) = \Delta\left[1 - e^{-\sigma t}\cos(w_D t) - \frac{\sigma}{w_D} e^{-\sigma t}\sin(w_D t)\right] \qquad (13)$$

$$C(t) = \Delta\left[1 - e^{-\zeta w_N t}\left[\cos(w_D t) - \frac{\zeta}{\sqrt{1-\zeta^2}}\sin(w_D t)\right]\right]$$

Since, $$A\cos(\alpha t) + B\sin(\alpha t) = D\sin(\alpha t + \phi) \qquad (14)$$

where, $$D = \sqrt{A^2 + B^2} \text{ and } \phi = \tan^{-1}\left(\frac{A}{B}\right) \qquad (15)$$

then, $$C(t) = \Delta\left[1 - \frac{1}{\sqrt{1-\zeta^2}} e^{-\zeta w_N t}\sin(w_D t + \phi)\right], \quad \phi = \tan^{-1}\left(\frac{\sqrt{1-\zeta^2}}{\zeta}\right) \qquad (16)$$

The deviation from the set point, called $C_{SP}(t)$, will be given by:

$$C_{SP}(t) = C^{SET}(t) - C(t) = \Delta - C(t) \qquad (17)$$

$$C_{SP}(t) = \frac{\Delta}{\sqrt{1-\zeta^2}} e^{-\zeta w_N t}\sin(w_D t + \phi)$$

Evaluating this expression at $t_1$, and one period later ($T_D$):

$$t = t_1 \text{ and } t = t_2 = t_1 + T_D \qquad (18)$$

then, $$C_{SP}(t_1) = \frac{\Delta}{\sqrt{1-\zeta^2}} e^{-\zeta w_N t_1}\sin(w_D t_1 + \phi), \text{ and} \qquad (19)$$

$$C_{SP}(t_2) = \frac{\Delta}{\sqrt{1-\zeta^2}} e^{-\zeta w_N t_2}\sin(w_D t_2 + \phi)$$

$$C_{SP}(t_2) = \frac{\Delta}{\sqrt{1-\zeta^2}} e^{-\zeta w_N (t_1 + T_D)}\sin(w_D (t_1 + T_D) + \phi)$$

and, $$C_{SP}(t_2) = \frac{\Delta}{\sqrt{1-\zeta^2}} e^{-\zeta w_N t_1} e^{-\zeta w_N T_D} \operatorname{Sin}(w_D t_1 + w_D T_D + \phi) \quad (20)$$

$$C_{SP}(t_2) = \frac{\Delta}{\sqrt{1-\zeta^2}} e^{-\zeta w_N t_1} e^{-\zeta w_N T_D} \operatorname{Sin}(w_D t_1 + 2\pi + \phi)$$

$$C_{SP}(t_2) = \frac{\Delta}{\sqrt{1-\zeta^2}} e^{-\zeta w_N t_1} e^{-\zeta w_N T_D} \operatorname{Sin}(w_D t_1 + \phi)$$

If the ratio of the two deviations is calculated, $$\frac{C_{SP}(t_2)}{C_{SP}(t_1)} = r_T = \frac{\frac{\Delta}{\sqrt{1-\zeta^2}} e^{-\zeta w_N t_1} \operatorname{Sin}(w_D t_1 + \phi)}{\frac{\Delta}{\sqrt{1-\zeta^2}} e^{-\zeta w_N t_1} e^{-\zeta w_N t_D} \operatorname{Sin}(w_D t_1 + \phi)} \quad (21)$$

$$r_T = e^{\zeta w_N T_D}$$

$$\ln(r_T) = \zeta w_N T_D = \zeta w_N \frac{2\pi}{w_D} = \zeta w_N \frac{2\pi}{w_N \sqrt{1-\zeta^2}}$$

$$\ln(r_T) = \frac{2\pi \zeta}{\sqrt{1-\zeta^2}}$$

Therefore, $$\zeta = \frac{\ln(r_T)}{\sqrt{4\pi^2 + \ln^2(r_T)}} \quad (22)$$

and by definition, $$w_D = \frac{2\pi}{T_D} = \frac{2\pi}{t_2 - t_1} \quad (23)$$

These two parameters, $\zeta$ and $W_D$, are the outputs from the Peak Detector block 30.

Once a damping ratio and a damped natural frequency have been identified, the scaling module 25 is used to calculate a normalized set of parameters to be used as inputs in the Fuzzy Inference System (FIS) 35. These parameters are the modified damping ratio, $\zeta^T$, and the representative frequency, $w_{MOD}$.

In a second-order system any oscillatory behavior is obtained for:

$$-1 < \zeta < 1 \quad (24)$$

with the following characteristics:
- $\zeta$ equal to 1 is a critically damped system, with no oscillatory behavior.
- $\zeta$ equal to 0.7071 is a system with approximate 5% overshoot, which we will consider an optimal response.
- $\zeta$ equal to 0 leads to a marginally stable response (sinusoidal behavior), to oscillatory for control applications.
- $\zeta$ less than 0 leads to unstable behavior (oscillations with continuously increasing amplitude).

Since the damping ratio ranges from −1 to 1, and our defined optimal value is 0.7071, a nonlinear transformation is used to obtain a modified damping ratio with a range from 0 to 1, with 0.7071 mapping at half-scale (0.5). If such transformation is given by the following structure:

$$\zeta^T = a + be^{c\zeta} \quad (25)$$

the scaling equation is obtained from simultaneous equations solution:

$$\zeta^T = -0.01 + 0.098 e^{2.335\zeta} \quad (26)$$

The second output from the scaling block 25 is the modified frequency. The actual Characteristic Ultimate Frequencies obtained from the stability analysis could provide two of the three frequencies very close to each other. This situation will make it very difficult for the inference system to decide possible cause of nonlinear behavior. To avoid this situation the frequencies will be mapped to a modified frequency interval [0,10], with the modified characteristic ultimate frequencies being equally spaced. Using the outputs from the characteristic ultimate frequencies block 20, based on the solution of Equations 8 and 9, the following mapping is done:

- A damped frequency of 0 leads to the minimum possible modified frequency, 0.
- The smallest characteristic frequency is set to 2.
- The intermediate characteristic frequency is set to 5.
- The largest characteristic frequency is set to 8.
- A damped frequency of 8π radians per minute leads to the maximum possible modified frequency, 10.

Therefore, once the peak detector calculates the damped natural frequency, the following transformation is used:

$$w_{MOD} = w_{MOD}^j + (w_D - w_D^j) \times \frac{w_{MOD}^i - w_{MOD}^j}{w_D^i - w_D^j} \quad (27)$$

where $w_D$ is the damped natural frequency obtained from the peak detector 30, $w_{MOD}$ is the modified frequency corresponding to the measured (calculated) frequency, $W_{MOD}^{i,j}$ are the reference modified frequencies in the neighborhood of the value to be found, and $w_D^{i,j}$ are the reference damped natural frequencies in the neighborhood of the measured damped natural frequency.

Figure 5:
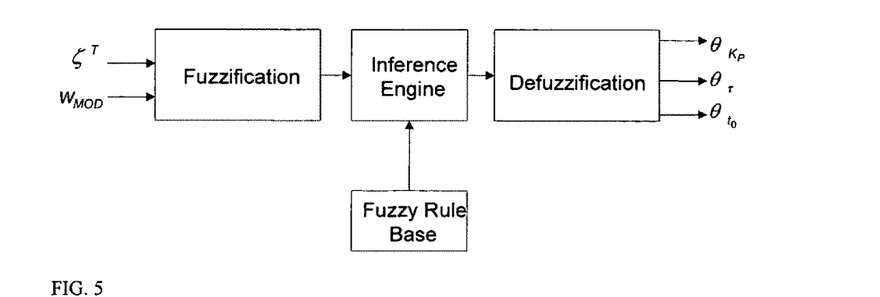
FIG. 5 is an illustration of the structure of the Fuzzy Inference System.

The fuzzy inference system 35 has the modified damping ratio and modified frequency as inputs, and change factors for controller gain, reset time, and rate time as outputs. FIG. 5 illustrates the structure of the fuzzy inference system.

Figure 6:
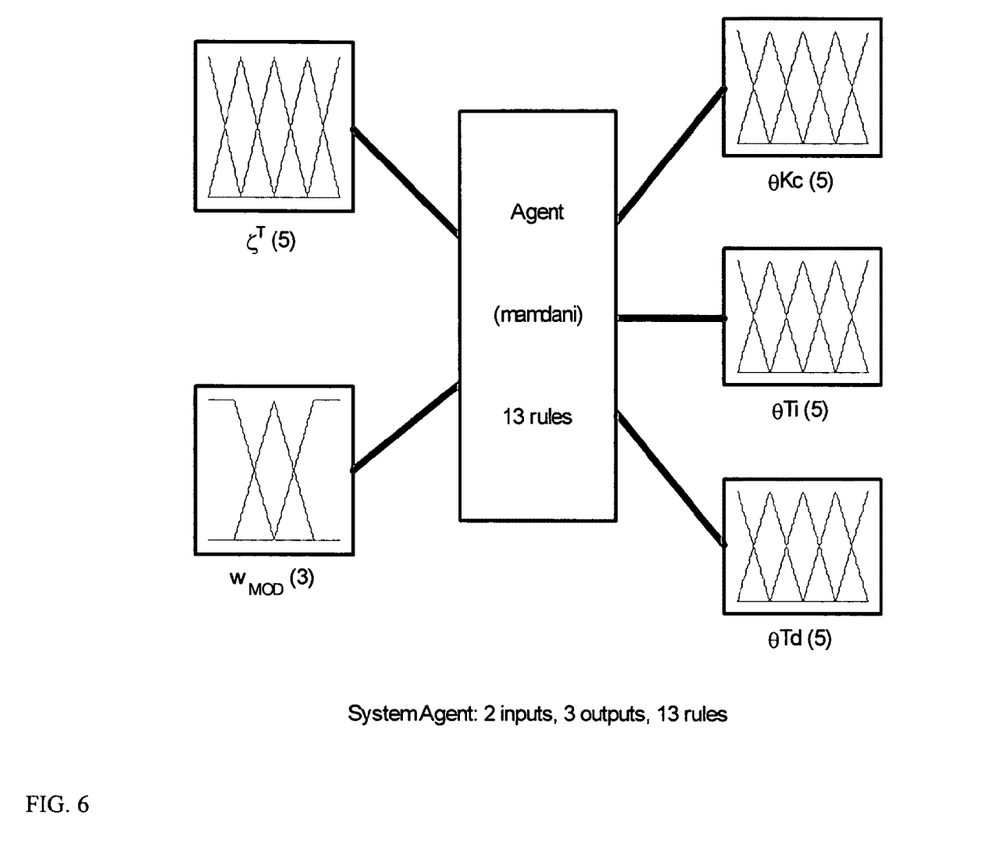
FIG. 6 is an illustration of architecture of the Fuzzy Inference System.
Figure 7:
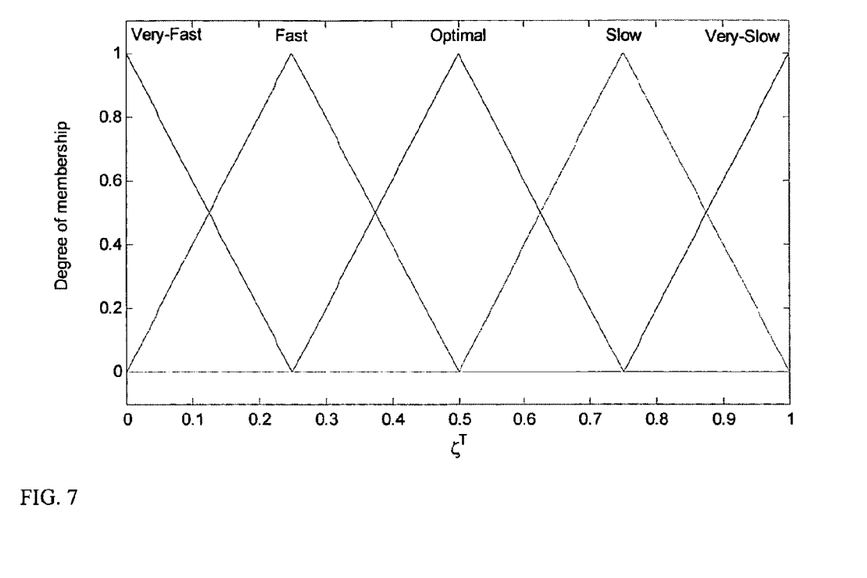
FIG. 7 is an illustration of linguistic values and MF for modified damping ratio.
Figure 8:
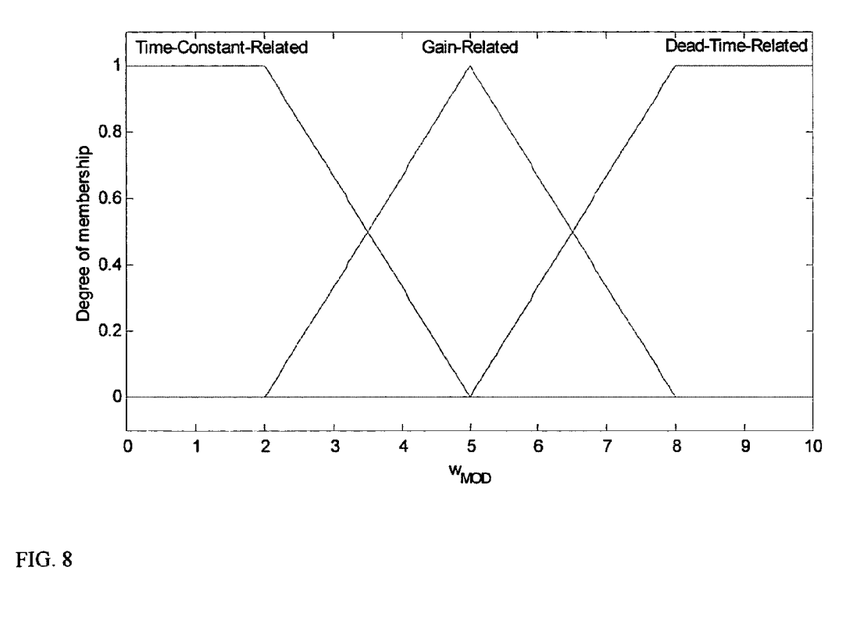
FIG. 8 is an illustration of linguistic values and MF for modified frequency.
Figure 9:
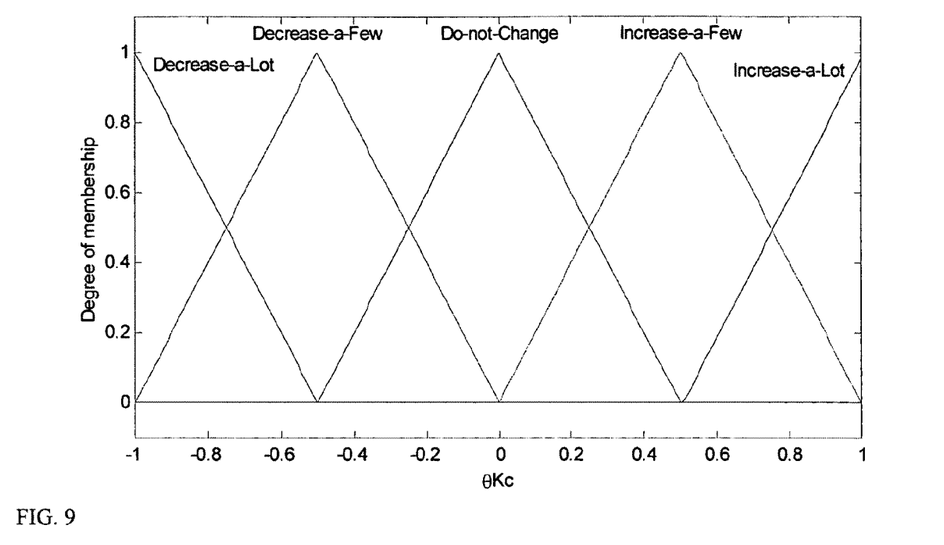
FIG. 9 is an illustration of linguistic values and MF for gain change factor.
Figure 10:
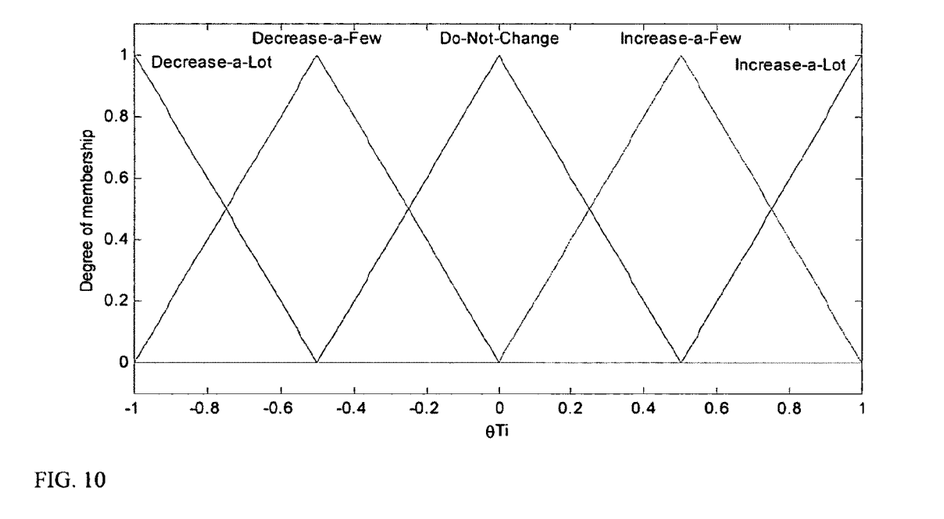
FIG. 10 is an illustration of linguistic values and MF for reset time change factor.
Figure 11:
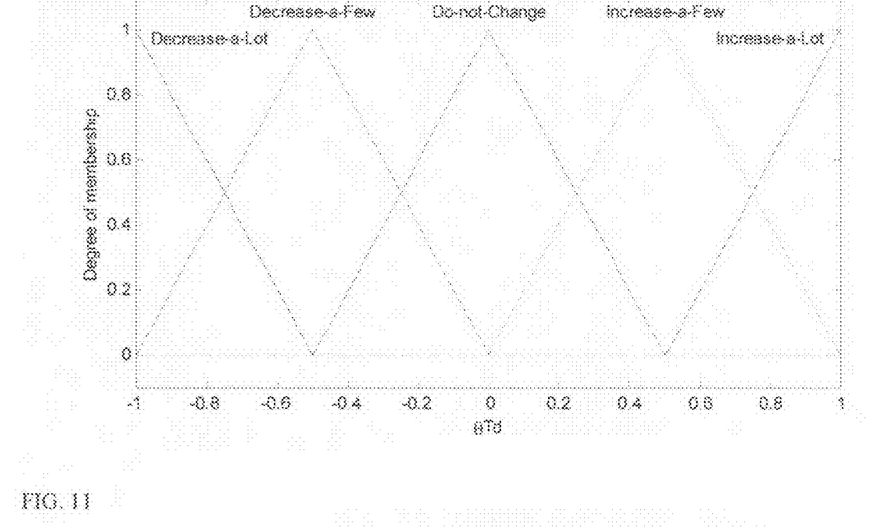
FIG. 11 is an illustration of linguistic values and MF for rate time change factor.

Triangular and trapezoidal membership functions are used to relate crisp variables with the degree of membership to linguistic values of their corresponding fuzzy variables. Five linguistic values are defined for the modified damping ratio: Very-fast, Fast, Optimal, Slow, and Very-Slow. Three linguistic values are defined for the modified frequency: Time Constant-Related, Gain-Related, and Dead Time-Related. Five linguistic values are defined for each one of the tuning parameters' change factors: Decrease-a-Lot, Decrease-a-Few, Do-not-Change, Increase-a-Few, and Increase-a-Lot. These outputs have a crisp range from −1 to 1. A Mamdani-type FIS is used with 13 rules in the rule base. FIG. 6 presents a summary of the FIS architecture.

FIGS. 7 through 11 show the membership functions relating crisp variables with degree of membership of the fuzzy variable to each linguistic value.

Table 1 presents the rules used in the FIS.

TABLE 1

Fuzzy Rules used in the Inference System

| IF | | THEN | | |
|---|---|---|---|---|
| $\zeta^T$ | $W_{MOD}$ | $\theta$ Kc | $\theta$ Ti | $\theta$ Td |
| Very-Fast | Gain-related | Decrease-a-Lot | Do-not-Change | Do-not-Change |
| Very-Fast | Time Constant-related | Decrease-a-Lot | Increase-a-Lot | Increase-a-Few |
| Very-Fast | Dead Time-related | Decrease-a-Lot | Increase-a-Few | Increase-a-Lot |
| Fast | Gain-related | Decrease-a-Few | Do-not-Change | Do-not-Change |
| Fast | Time Constant-related | Decrease-a-Few | Increase-a-Few | Do-not-Change |
| Fast | Dead Time-related | Decrease-a-Few | Do-not-Change | Increase-a-Few |
| Optimal | | Do-not-Change | Do-not-Change | Do-not-Change |
| Slow | Gain-related | Increase-a-Few | Do-not-Change | Do-not-Change |
| Slow | Time Constant-related | Do-not-Change | Decrease-a-Few | Decrease-a-Few |
| Slow | Dead Time-related | Increase-a-Few | Do-not-Change | Do-not-Change |
| Very-Slow | Gain-related | Increase-a-Few | Do-not-Change | Do-not-Change |
| Very-Slow | Time Constant-related | Increase-a-Few | Decrease-a-Few | Decrease-a-Few |
| Very-Slow | Dead Time-related | Increase-a-Few | Decrease-a-Few | Increase-a-Few |

Figure 12:
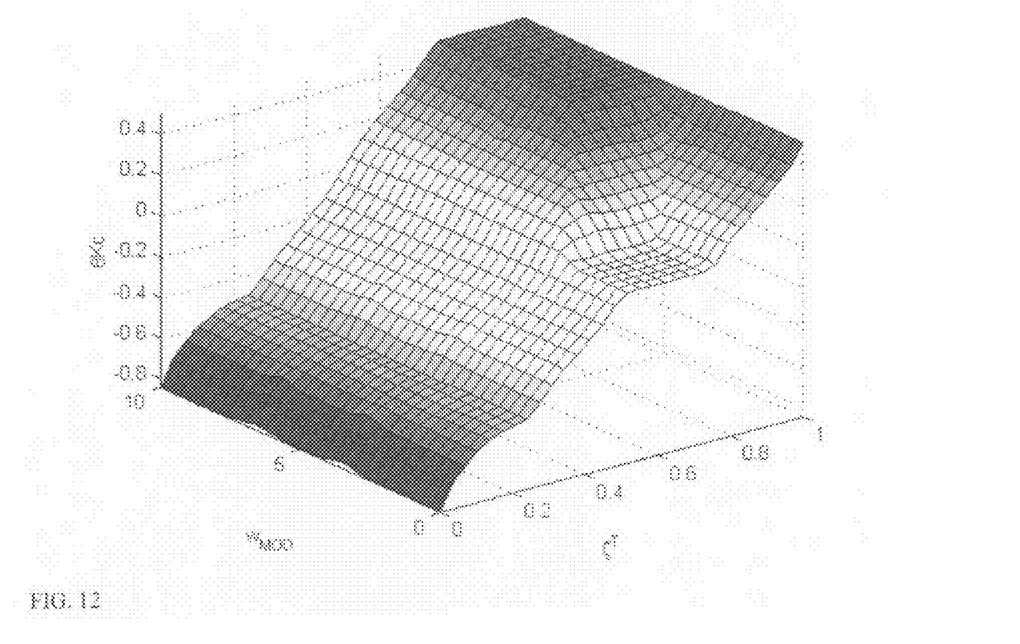
FIG. 12 is an illustration of the nonlinear surfaces relating inputs and outputs.
Figure 13:
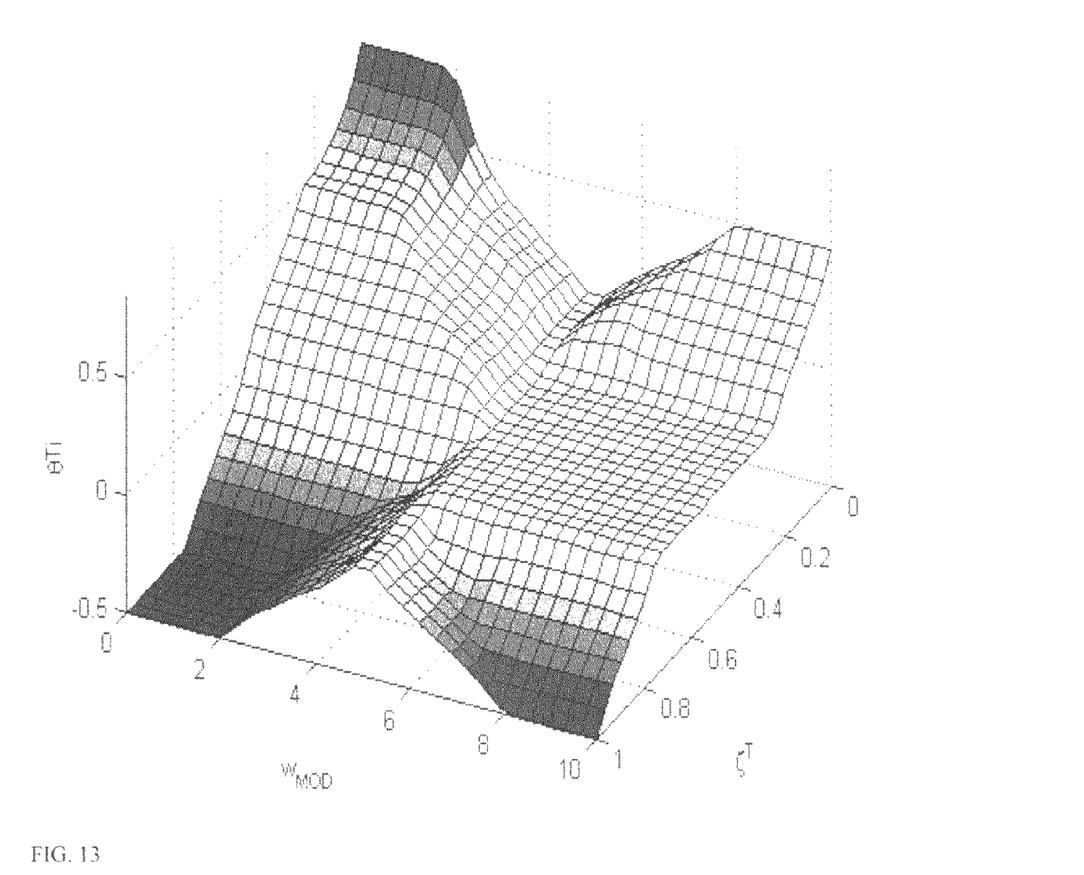
FIG. 13 is an illustration of the nonlinear surfaces relating inputs and outputs.
Figure 14:
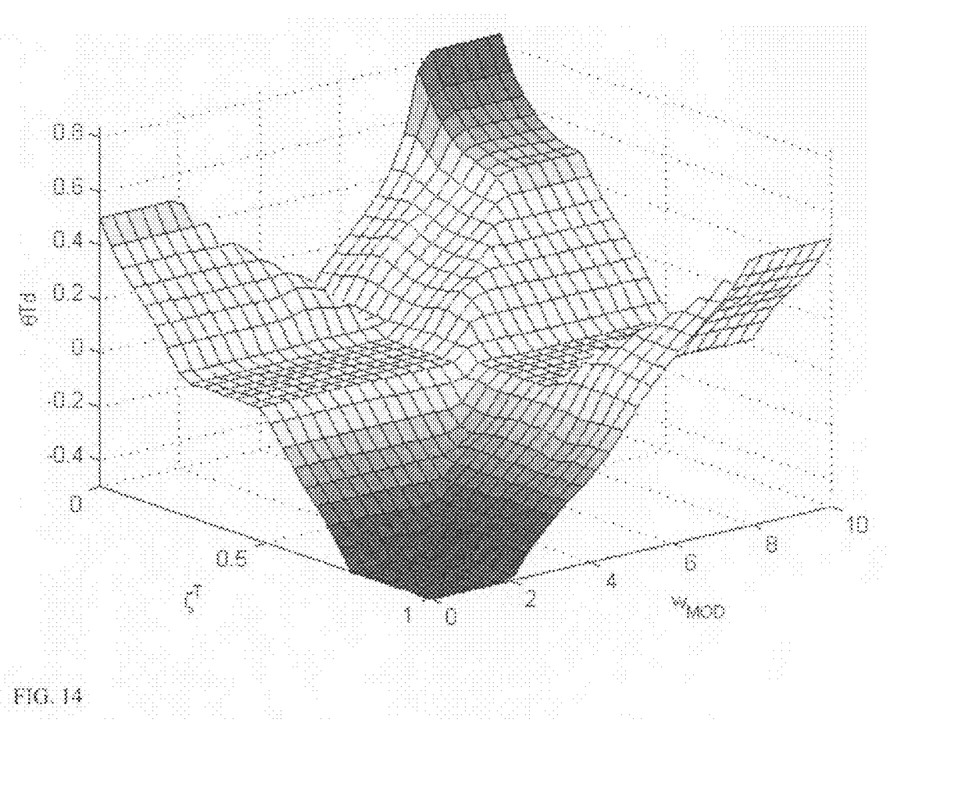
FIG. 14 is an illustration of the nonlinear surfaces relating inputs and outputs.

FIGS. 12 through 14 illustrate the nonlinear surfaces relating inputs and outputs.

Once the Fuzzy Inference System 35 has calculated the change factor vector, θ, based on the nonlinear behavioral pattern that was identified, such values are used to obtain the new set of tuning parameters.

Defining:

$T_P^{OLD}$ as the previous set of tuning parameters, with the first component being the controller gain, $K_C$, the second component being the controller reset time, $T_I$, and the third component being the controller rate time, $T_D$.

$T_P^{NEW}$ as the new set of tuning parameters,

γ as the change index of θ, a tuning parameter of the fuzzy supervisor, that determines how aggressive the adaptation is going to be.

The following equation describes the accumulator block 40:

$$T_P^{NEW}(i) = T_P^{OLD}(i)[1+\gamma\theta(i)], \text{ for } i=1, 2, 3 \quad (28)$$

The change index of θ, γ, is a parameter defined between 0 and 1. When γ is equal to 0 no adaptation is performed. When γ is equal to 1 an aggressive type of adaptation can be observed. The recommended starting value is γ equal to 0.5.

For implementation and testing purposes the Fuzzy Supervisor—Type 1 of the present invention uses an on-line peak detection algorithm with noise tolerance, limiting the system's ability to compensate for small amplitude oscillations but allowing noise tolerance, avoiding tuning changes due to signal noise. The peak detection method uses an accelerated mode that makes decisions with two peaks (one low and one high), using half period rather than waiting for a complete period of oscillation. The modified equations, equivalent to Eqs. 22 and 23 are:

$$\zeta = \frac{\ln(r_T)}{\sqrt{\pi^2 + \ln^2(r_T)}} \text{ and,} \quad (29)$$

$$w_D = \frac{\pi}{t_2 - t_1} \quad (30)$$

The programs listed in Appendix 3 are required for the implementation of the Fuzzy Supervisor—Type 1 (FST1) of the present invention. The programs were developed in Matlab v5.3 and the simulations were built in Simulink v3.0. Toolboxes used in this implementation are Fuzzy Logic Toolbox v2.0.1, Statistics Toolbox v2.2, and the Optimization Toolbox v2.0. Matlab, Simulink, and the referenced toolboxes are registered marks by The Mathworks, Inc. (www.mathworks.com).

Peak detection algorithm: Dyneval.m v2.0.

Characteristic Frequencies Estimator: Wuch.m v1.0, Kvw.m v1.0, Tauvw.m v1.0, and tovw.m v1.0.

Scaling Functions: Psit.m v2.0 and Wdt.m v1.0.

Fuzzy Inference System: Agent.fis v2.2.

Figure 15:
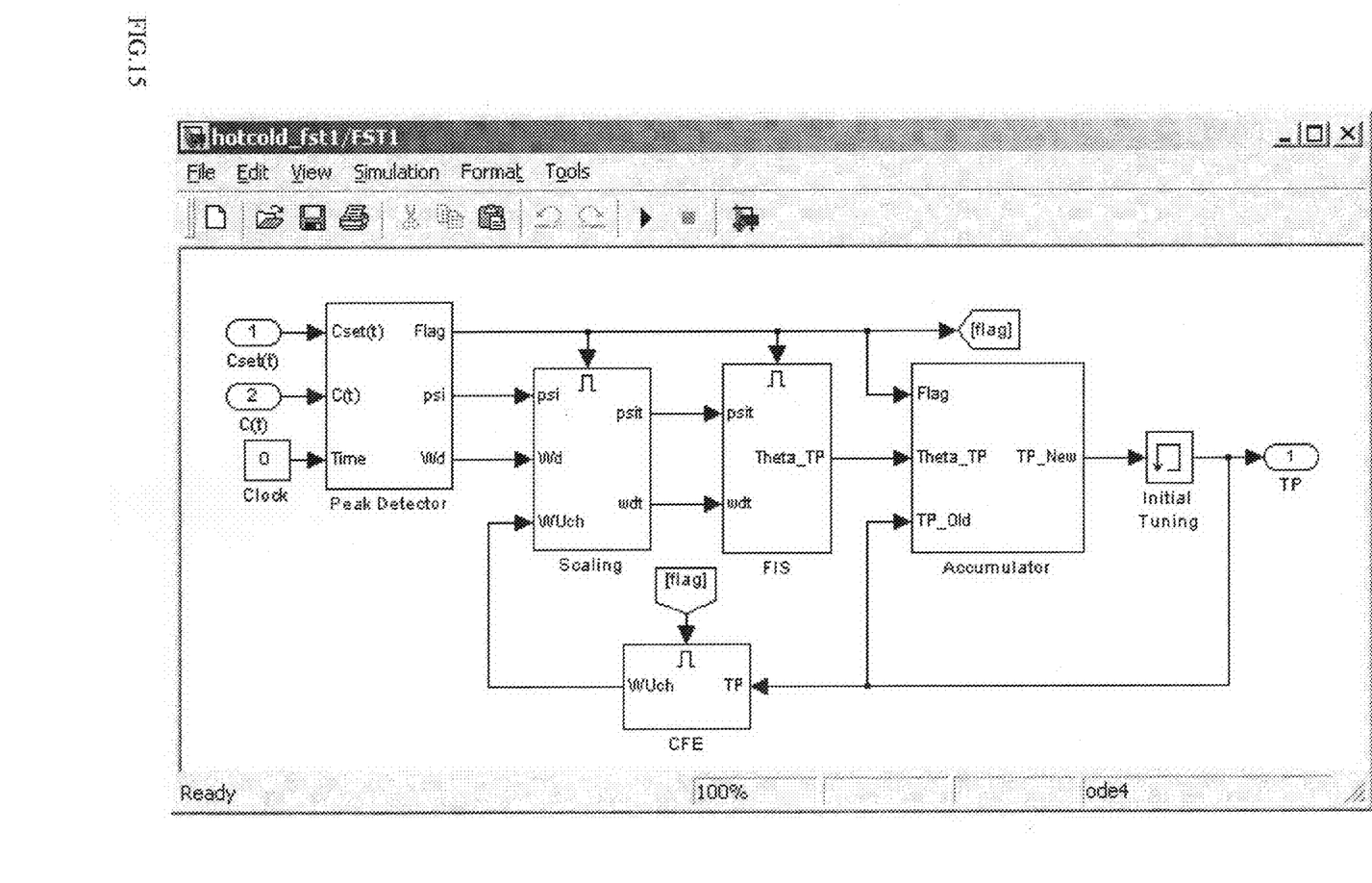
FIG. 15 is an illustration of the Simulink Architecture of the FST1.

The Simulink block diagram implementation of the FST1 is also presented in this document.

4. Programs Required to Implement the FST1

The following function implements the peak detection algorithm to calculate the damping ratio and the damped natural frequency based on two consecutive peaks (peak and valley) in the process response.

```
function [dyn] = dyneval2 (sp,c,t);
% Peak Detector Algorithm
% Global Variables
global tp psi wd cref3 tref3 cref2 tref2 cref1 tref1 Vpeak Tpeak flag peak
%Initialization
if t==0,
    tp=0;
    cref3=c;
    cref2=c;
    cref1=c;
    tref3=0;
    tref2=0;
    tref1=0;
    peak=0;
    psi=0.7071;
    wd=1;
    flag=0;
    Vpeak=[c c];
    Tpeak=[0 0];
end;
% Parameters
SamplingT=0.1; %0.1
Noise_Amp=0.5;
Max_Time1=3*3; %5
Max_Time2=8*3; %5
% Time Check
if t>=tp+SamplingT,
    % (0) Reset
    flag=0;
    psi=0.7071;
    wd=1;
% (1a) Reset Search by Time
if (t-tref2)>(tref2-tref1)+Max_Time1,
    cref3=c;
    tref3=t;
```

```
        cref2=c;
        tref2=t;
        cref1=c;
        tref1=t;
    end;
    % (1b) Reset Peak by Time
    if ((t-Tpeak(1))>Max_Time2)&(peak==1),
        peak=0;
        cref3=c;
        tref3=t;
        cref2=c;
        tref2=t;
        cref1=c;
        tref1=t;
    end;
    % (2) Deviation check
    if abs(c-sp)>Noise_Amp,
        % Look for Reference
        if abs(c-cref3)>Noise_Amp,
            cref1=cref2;
            tref1=tref2;
            cref2=cref3;
            tref2=tref3;
            cref3=c;
            tref3=t;
            % Check for Peak
            if (cref3-cref2)*(cref2-cref1)<0,
                Vpeak(peak+1)=cref2;
                Tpeak(peak+1)=tref2;
                peak=peak+1;
                % Check If Complete
                if peak==2,
                    % Calculate
                    cdev1=Vpeak(1)-sp;
                    cdev2=Vpeak(2)-sp;
                    if cdev1*cdev2<0,
                        ratio=abs(cdev1/cdev2);
                        psi=log(ratio)/sqrt(pi^2+(log(ratio))^2);
                        wd=pi/(Tpeak(2)-Tpeak(1));
                        flag=1;
                    end;
                    % Reset
                    peak=0;
                    cref3=c;
                    cref2=c;
                    cref1=c;
                end;
            end;
        end;
    end;
    % (3) Update Time
    tp=t;
end;
% Write Output
dyn=[psi wd flag];
```

The following function is used to calculate the characteristic ultimate frequencies for the process based on the current tuning parameters used in the controller.

```
function [Wch] = wuch(TP);
% function [Wch,Pu,Nu] = wuch(TP);
% Calculate characteristic ultimate frequencies for gain, time constant,
% and dead time.
Kc=TP(1);
Ti=TP(2);
Td=TP(3);
to=2*Td;
Tau=Ti;
Kp=Tau/(1.2*Kc*to);
options=optimset('fmincon');
flagkp=0;
flagtau=0;
flagto=0;
global tsample
tsample=0.4*Tau;
% Calculating Characteristic Ultimate Frequency for Process Gain
n=-2;
while flagkp==0,
    [Kvw,fval,exitflag]=fmincon('Kvw',[Kp*10 100],[ ],[ ],[ ],[ ],
    [0.1 0.1], [30 15],[ ],options,TP,[Tau to],n);
    if (exitflag>=0)&(fval'*fval<0.1),
        Wch(1)=Kvw(2);
        Pu(1)=Kvw(1);
        Nu(1)=n;
        flagkp=1;
    end;
    n=n+1;
    if n==6,
        flagkp=1;
        Wch(1)=5;
    end;
end;
% Calculating Characteristic Ultimate Frequency for Process
Time Constant
n=-2;
while flagtau==0,
    [Tauvw,fval,exitflag]=fmincon('Tauvw',[Tau*0.5 100],[ ],[ ],[ ],
    [ ],[0.1 0.1],[15 15],[ ],options,TP,[Kp to],n);
    if (exitflag>=0)&(fval'*fval<0.1),
        Wch(2)=Tauvw(2);
        Pu(2)=Tauvw(1);
        Nu(2)=n;
        flagtau=1;
    end;
    n=n+1;
    if n==6,
        flagtau=1;
        Wch(2)=10;
    end;
end;
% Calculating Characteristic Ultimate Frequency for Process Dead Time
n=-2;
while flagto==0,
    [tovw,fval,exitflag]=fmincon('tovw',[to*10 100],[ ],[ ],[ ],[ ],[0.1
    0.1],[20 15],[ ],options,TP,[Kp Tau],n);
    if (exitflag>=0)&(fval'*fval<0.1),
        Wch(3)=tovw(2);
        Pu(3)=tovw(1);
        Nu(3)=n;
        flagto=1;
    end;
    n=n+1;
    if n==12,
        flagto=1;
        Wch(3)=2;
    end;
end;
```

The following function is used to estimate the error in the estimation of the characteristic ultimate frequency for the process gain. It is an internal function called by the nonlinear solver.

```
function [OutKc] = Kvw (Par,TP,Pchar,n);
% Frequency solution for marginal stability for Kpu and wukp.
% Equations 3.2.8 and 3.2.9
Kc=TP(1);
Ti=TP(2);
Td=TP(3);
Tau=Pchar(1);
to=Pchar(2);
Kp=Par(1);
w=Par(2);
a=0.1;
tm1=Tau*w;
tm2=to*w;
tm3=1+a*Td/Ti;
tm4=1/Ti*w-Td*(a+1)*w;
tm5=-a*Td*w;
```

-continued

```
out1=Kc*Kp*sqrt(tm4^2+tm3^2)/(sqrt(1+tm1^2)*sqrt(1+tm5^2))-1;
out2=-tm2-atan(tm1)+atan(tm3/tm4)-atan(1/tm5)+(2*n-1)*pi;
OutKc=out1^2+out2^2;
```

The following function is used to estimate the error in the estimation of the characteristic ultimate frequency for the process time constant. It is an internal function called by the nonlinear solver.

```
. function [OutTau] = Tauvw (Par,TP,Pchar,n);
% Frequency solution for marginal stability for Tauu and wutau.
% Equations 3.2.8 and 3.2.9
Kc=TP(1);
Ti=TP(2);
Td=TP(3);
Kp=Pchar(1);
to=Pchar(2);
Tau=Par(1);
w=Par(2);
a=0.1;
tm1=Tau*w;
tm2=to*w;
tm3=1+a*Td/Ti;
tm4=1/Ti*w-Td*(a+1)*w;
tm5=-a*Td*w;
out1=Kc*Kp*sqrt(tm4^2+tm3^2)/(sqrt(1+tm1^2)*sqrt(1+tm5^2))-1;
out2=-tm2-atan(tm1)+atan(tm3/tm4)-atan(1/tm5)+(2*n-1)*pi;
OutTau=out1^2+out2^2;
```

The following function is used to estimate the error in the estimation of the characteristic ultimate frequency for the process dead time. It is an internal function called by the nonlinear solver.

```
function [Outto] = tovw (Par,TP,Pchar,n);
% Frequency solution for marginal stability for tou and wuto.
% Equations 3.2.8 and 3.2.9
Kc=TP(1);
Ti=TP(2);
Td=TP(3);
Kp=Pchar(1);
Tau=Pchar(2);
to=Par(1);
w=Par(2);
a=0.1;
tm1=Tau*w;
tm2=to*w;
tm3=1+a*Td/Ti;
tm4=1/Ti*w-Td*(a+1)*w;
tm5=-a*Td*w;
out1=Kc*Kp*sqrt(tm4^2+tm3^2)/(sqrt(1+tm1^2)*sqrt(1+tm5^2))-1;
out2=-tm2-atan(tm1)+atan(tm3/tm4)-atan(1/tm5)+(2*n-1)*pi;
Outto=out1^2+out2^2;
```

The following function is used to scale the damping ratio.

```
. function [pt]= psit(p);
% Scaling of Damping Ratio
% pt=-(1-exp((p+1)*2.3347))/105.6337;
pt=-0.01+0.098*exp(2.335*p);
```

The following function is used to map the observed damped natural frequency into the modified natural frequency.

```
function [wdmod] = wdt(wd,wuchar);
% Modified damped natural frequency scaled from 0-10.
% Equation 3.3.2.3
%Definitions
wme=[0 2 5 8 10];
wfe=[0 wuchar(3) min(wuchar(1:2)) max(wuchar(1:2)) 8*pi];
%Search Index
flag_ix=0;
for i=2:4,
    if (wd<wfe(i))&(flag_ix==0),
        n=i;
        flag_ix=1;
    elseif (i==4)&(flag_ix==0),
        n=5;
    end;
end;
%Scaling
wdmod=interp1(wfe(n-1:n),wme(n-1:n),wd);
```

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described, What is claimed is:

1. A method of avoiding oscillatory behavior in a PID controller in a closed-loop process, the method comprising the steps of:
    identifying an ultimate set of tuning parameters for the closed-loop process;
    observing an oscillatory behavior response in the closed-loop process;
    identifying a damped natural frequency from the oscillatory behavior response;
    identifying a damping ratio from the oscillatory behavior response;
    calculating a modified damped natural frequency from the damped natural frequency;
    calculating a modified damping ratio from the damping ratio;
    determining the degree of oscillation of the oscillatory behavior response and determining the leading cause of the oscillatory behavior response from the calculated modified damped natural frequency and the calculated modified damping ratio of the oscillatory behavior response; and
    adjusting the ultimate set of tuning parameters of the closed-loop process based upon the degree oscillation of the oscillatory behavior response the leading cause of the oscillatory behavior response, thereby avoiding oscillatory behavior in the PID controller.

2. The method of claim 1, wherein the step of identifying an ultimate set of tuning parameters for the closed-loop process further comprises:
    calculating an ultimate process gain and a corresponding ultimate frequency for the ultimate process gain of the closed-loop process;

calculating an ultimate process time constant and a corresponding ultimate frequency for the ultimate process time constant of the closed-loop process; and calculating an ultimate process dead time and a corresponding ultimate frequency for the ultimate process dead time of the closed-loop process.

3. The method of claim 1, wherein the damped natural frequency and the damping ratio are identified from a dynamic analysis of the closed-loop system step response.

4. The method of claim 1, wherein the step of determining the degree of oscillation of the oscillatory behavior response and determining the leading cause of the oscillatory behavior response from the calculated modified damped natural frequency and the calculated modified damping ratio of the oscillatory behavior response further comprises utilizing fuzzy inference rules to identify a change factor vector to adjust the ultimate set of tuning parameters.

5. The method of claim 4, wherein the fuzzy inference rules further comprises five linguistic values for the modified damping ratio, including very-fast, fast, optimal, slow and very-slow.

6. The method of claim 4, wherein the fuzzy inference rules further comprises three linguistic values for the modified damped natural frequency, including time constant-related, gain-related and dead time-related.

7. The method of claim 4, wherein the fuzzy inference rules further comprises five linguistic values for each one of the tuning parameters' change factors, including decrease-a-lot, decrease-a-few, do-not-change, increase-a-few, and increase-a-lot.

8. The method of claim 1, wherein the step of adjusting the ultimate set of tuning parameters of the closed-loop process based upon the degree of oscillation of the oscillatory behavior response and the leading cause of the oscillatory behavior response, further comprises calculating a new set of tuning parameters.

9. The method of claim 8, further comprising calculating a tuning parameter that determines the aggressiveness of the adjustment.

10. The method of claim 2, further comprising the step of estimating an error in the calculated ultimate process gain frequency for the ultimate process gain.

11. The method of claim 2, further comprising the step of estimating an error in the calculated ultimate process time constant frequency for the ultimate process time constant.

12. The method of claim 2, further comprising the step of estimating an error in the calculated ultimate process dead time frequency for the ultimate process dead time.

13. A PID controller system for avoiding oscillatory behavior in a closed-loop process, the PID controller system comprising:

a characteristic frequency estimator to identify an ultimate set of tuning parameters for the closed-loop process experiencing an oscillatory behavior response;

a peak detector to calculate a damped natural frequency and a damping ratio from the oscillatory behavior response of the closed-loop process;

a scaling module to receive the damped natural frequency and the damping ratio and to output a modified damped natural frequency and a modified damping ratio;

a fuzzy inference system to receive the modified damped natural frequency and the modified damping ratio, to determine the degree of oscillation of the oscillatory behavior response and to determine the leading cause of the oscillatory behavior response and to output a change factor vector based on the oscillatory behavior response; and an accumulator to receive the change factor vector and to output a new set of tuning parameters for the closed-loop process.

14. The system of claim 13, wherein the ultimate set of tuning parameters further comprising an ultimate process gain and a corresponding ultimate frequency for the ultimate process gain, an ultimate process time constant and a corresponding ultimate frequency for the ultimate process time constant, and an ultimate process dead time and a corresponding ultimate frequency for the ultimate process dead time.

15. The system of claim 13, wherein the damped natural frequency and the damping ratio are calculated from a dynamic analysis of the closed-loop system step response.

16. The system of claim 13, wherein the fuzzy inference system utilizes fuzzy inference rules to output a change factor vector based on the oscillatory behavior response.

17. The system of claim 16, wherein the fuzzy inference rules further comprises five linguistic values for the modified damping ratio, including very-fast, fast, optimal, slow and very-slow.

18. The system of claim 16, wherein the fuzzy inference rules further comprises three linguistic values for the modified damped natural frequency, including time constant-related, gain-related and dead time-related.

19. The system of claim 16, wherein the fuzzy inference rules further comprises five linguistic values for each one of the tuning parameters' change factors, including decrease-a-lot, decrease-a-few, do-not-change, increase-a-few, and increase-a-lot.

20. The system of claim 13, wherein the output of the accumulator further comprises a tuning parameter that determines the aggressiveness of the adjustment.

* * * * *